(12) United States Patent
Grover

(10) Patent No.: US 8,137,439 B2
(45) Date of Patent: Mar. 20, 2012

(54) PROCESS AND APPARATUS FOR CO$_2$ RECOVERY FROM FLUE GAS WITH THERMOCOMPRESSION

(75) Inventor: Bhadra S. Grover, Sugar Land, TX (US)

(73) Assignee: Air Liquide Process & Construction, Inc., Houston, TX (US)

( * ) Notice: Subject to any disclaimer, the term of this patent is extended or adjusted under 35 U.S.C. 154(b) by 378 days.

(21) Appl. No.: 12/552,685

(22) Filed: Sep. 2, 2009

(65) Prior Publication Data

US 2010/0224061 A1    Sep. 9, 2010

Related U.S. Application Data

(60) Provisional application No. 61/093,756, filed on Sep. 3, 2008.

(51) Int. Cl.
*B01D 53/04* (2006.01)

(52) U.S. Cl. .................. 95/106; 95/115; 95/139

(58) Field of Classification Search ............. 95/96, 106, 95/114, 115, 139; 96/121, 126; 423/230
See application file for complete search history.

(56) References Cited

U.S. PATENT DOCUMENTS

| 4,696,681 A * | 9/1987 | LLoyd-Williams ............ 95/115 |
| 5,846,295 A * | 12/1998 | Kalbassi et al. ................ 95/105 |
| 2003/0037672 A1 * | 2/2003 | Sircar ............................... 95/96 |
| 2006/0196361 A1 * | 9/2006 | Henderson et al. ............ 96/148 |
| 2009/0049984 A1 * | 2/2009 | Vertriest ............................. 95/41 |
| 2009/0165643 A1 * | 7/2009 | Huberland ........................ 95/14 |

FOREIGN PATENT DOCUMENTS

| WO | 02087730 | 11/2002 |
| WO | 2006094190 | 9/2006 |
| WO | 2009017832 | 2/2009 |

OTHER PUBLICATIONS

Radosz, M. et al. "Flue-Gas Carbon Capture on Carbonaceous Sorbents: Toward a Low Cost Multifunctional Carbon Filter for "Green" Energy Producers", American Chemical Society, Apr. 29, 2008.
PCT Search Report and Written Opinion for PCT/IB2009/053854, mailed Dec. 2009.

* cited by examiner

*Primary Examiner* — Frank Lawrence, Jr.
(74) *Attorney, Agent, or Firm* — Elwood L. Haynes

(57) ABSTRACT

A process for the recovery of CO$_2$ from a flue gas is provided. This process includes compressing a flue gas to a first pressure, cooling the flue gas to a first temperature, and drying flue gas by a drying means. This process includes adsorbing CO$_2$ in a first adsorbent bed, wherein the first adsorbent bed is isothermally maintained by a first cooling means. The process includes pressurizing the first adsorbent bed to a second pressure with CO$_2$ at a second temperature, wherein the second pressure is greater than the initial pressure, wherein the second temperature is greater than the initial temperature.

20 Claims, No Drawings

PROCESS AND APPARATUS FOR $CO_2$ RECOVERY FROM FLUE GAS WITH THERMOCOMPRESSION

CROSS REFERENCE TO RELATED APPLICATION

This application claims the benefit of U.S. Provisional Application No. 61/093,756, filed Sep. 3, 2008, the entire contents of which are incorporated herein by reference.

BACKGROUND $CO_2$ removal from flue gas has been done on limited scale for long time. Currently, there is an increased emphasis on $CO_2$ capture to reduce green house emissions.

The use of an amine wash has been the most common technology for $CO_2$ removal. It is energy intensive due to the large amount of heat required for the regeneration of amine solution. The $CO_2$ product is always at low pressure of around 5 to 10 psig. There are also issues about the degradation of amine solution due to the presence of $O_2$, $NO_x$ and $SO_2$ in the flue gas.

$CO_2$ removal by the use of PSA technology with various solid adsorbents, such as carbon and zeolites has also been studied. Refer to the paper "Flue-Gas Carbon Capture on Carbonaceous Sorbents: Toward a Low-Cost Multifunctional Carbon Filter for Green Energy Producers" by Maciej Radoz, Xudong Hu, Kaspars Krutkramelis, and Young Shen" Ind. Eng. Chem. Res. 2008, 47, 3783-3794. This paper describes a PSA cycle for $CO_2$ recovery using activated carbon. It teaches that carbon is superior to zeolite for this application. The regeneration of the PSA is done with vacuum or with direct-steam or hot $CO_2$.

Vacuum regeneration increases the power required to compress the $CO_2$ to a typical pressure of about 2000 psig. The thermal regeneration with steam or hot $CO_2$ occurs at ambient pressure. However the compression power for $CO_2$ remains high.

Carbon as a media for adsorption has several disadvantages. Its capacity for $CO_2$ is low compared to the zeolites. It also has the disadvantage that it co-adsorbs $N_2$. $CO_2/N2$ selectivity is under 10. $CO_2$ product is thus contaminated with significant amount of $NO_2$, on the order of 10% or more.

SUMMARY

The present invention is a process for the recovery of $CO_2$ from a flue gas. This invention includes compressing a flue gas to a first pressure, cooling the flue gas to a first temperature, and optionally drying flue gas by a drying means. The present invention also involves adsorbing $CO_2$ in a first adsorbent bed, wherein said first adsorbent bed is at said first temperature and said first pressure, wherein said first adsorbent bed is isothermally maintained by a first cooling means. The present invention also includes pressurizing said first adsorbent bed to a second pressure with $CO_2$ at a second temperature, wherein said second pressure is greater than said first pressure, wherein said second temperature is greater than said first temperature. The present invention also includes heating said first adsorbent bed to a third temperature with a first heating means, thereby increasing said first adsorbent bed to a third pressure, wherein said third temperature is greater than said second temperature, wherein said third pressure is greater than said second pressure, thereby releasing a first portion of adsorbed $CO_2$. The present invention also includes lowering the pressure of said first adsorbent bed in at least one more stage, while said first adsorbent bed is isothermally maintained at said third temperature by a second heating means, thereby releasing at least a second portion of adsorbed. The present invention also includes cooling the released $CO_2$ with at least a second cooling means, sending said cooled $CO_2$ to one or more surge drums, and purging said first adsorption bed with a N2 stream, simultaneously cooling said first adsorption bed with a third cooling means. The present invention includes compressing said cooled $CO_2$ from said surge drums in a multi-stage compressor, wherein the pressure of the $CO_2$ from each surge drum is approximately equal to the inter-stage pressure into which it is admitted, and regenerating said first adsorption bed with a N2 stream, wherein said regeneration stream is heated by a third heating means.

DESCRIPTION OF PREFERRED EMBODIMENTS

The present process uses zeolite as the medium for separation. The zeolite chosen has small capacity for water, and its CO2 loading capacity is not greatly affected by the presence of moisture. Optionally moisture is removed by passing the gas over another adsorbent such as alumina. $CO_2$ is adsorbed at a low pressure of abut 1 to 2 bara. However the regeneration is done at elevated temperature of about 300-400° C. and at an elevated pressure of about 2-25 bara.

The following data is for a $H_2$ SMR application. The flue gas from the SMR furnace is at ambient pressure and 120-150° C. It contains approximately 20% $CO_2$ with the balance being $N_2$ and Ar. The $CO_2$ loadings on zeolite 13X are as shown below

| Partial Pressure Bara | Temperature ° C. | Loading wt % |
|---|---|---|
| 0.2 | 20 | 18 |
| 0.4 | 20 | 19.6 |
| 1 | 300 | 0.8 |
| 2 | 300 | 1.5 |
| 10 | 300 | 5.4 |
| 20 | 300 | 8.5 |

This illustrates that the zeolite bed will pick up 18% of its weight when it is in equilibrium with 0.2 bar $CO_2$ partial pressure (1 bara total pressure, 20% $CO_2$) in the flue gas. If the $CO_2$ loaded bed is heated to about 300° C. its equilibrium pressure will exceed 20 bar. Equilibrium loading at 300° C. and 20 bar is 8.5%. This means a significant part of $CO_2$ that was adsorbed on the bed (from 18% to 8.5% loading) can be withdrawn from the bed at 300° C. and 20 bar. When the bed pressure is reduced at about 300° C. below 20 bar more CO2 is released. If the bed pressure is reduced to 1 bar, the residual $CO_2$ loading is only 0.8%. In this cycle the bed loading changed from 18% to 0.8%. The bed can be considered regenerated. It is cooled and ready for next cycle.

The co-adsorption of $N_2$ is small as shown in the data below for 5° C.

| Partial Pressure of $N_2$ | Partial Pressure of $CO_2$ | Loading, wt % |
|---|---|---|
| 0.5 bar | 0 | 1.1 |
| 0.5 bar | 0.5 bar | 0.01 |

The adsorption of $CO_2$ is exothermic (30 kJ/g mol $CO_2$). It is desirable to cool the bed during adsorption, to keep it isothermal and maximize the $CO_2$ loading. The bed design also provides for quick heating to minimize the total cycle time. The total cycle time determines the inventory of the adsorbent and the bed size. A radial bed with heat transfer coil provides low pressure drop and quick heating and cooling cycle. Structured adsorbent can be formed into bed with channels that can pass heating or cooling media.

The $N_2$ stream out of the adsorption bed is dry and mostly free of $CO_2$. It can be used as regeneration gas.

Heat integration is important for the thermal efficiency of the process. The heat in flue gas at about 120-150° C. is a significant source of heat. If the $CO_2$ product is further compressed to about 150-200 bar, the heat of compression can also be used as a source of heat. Heat exchange between the bed being heated and the bed being cooled is also important.

The heat in the syngas can be utilized to heat the glycol to the desired temperature. Normally heat in syngas below about 120-150° C. is rejected to air or cooling water. Part of this heat can also be utilized for heating the adsorbent bed.

A glycol solution or other heat transfer media such as Dowtherm is proposed to recover heat from flue gas, syngas, and compressor intercooler. A similar heat transfer media is proposed for heating and cooling the zeolite beds.

The heat in the flue gas or the heat of compression may also be used to produce refrigeration by absorption refrigeration cycle (such as ammonia absorption refrigeration or lithium bromide refrigeration). The refrigeration can be used to chill the flue gas to about 5° C. This will reduce the amount of moisture in the flue gas. It will also increase $CO_2$ loading on the zeolite by about 10%.

Due to great affinity of most zeolites for water, all the moisture present in the flue gas will be removed. The zeolite 13X picks up about 20-25 times its weight in water. It is preferred that a separate bed upstream be provided to remove moisture. This bed is regenerated by the $N_2$ stream exiting the $CO_2$ adsorption bed. The N2 stream is heated by heat exchange with hot glycol.

In one embodiment of the proposed process, the flue gas is compressed in a blower to about 0.3-0.5 barg. This flue gas is cooled to about 40 C by indirect heat exchange with glycol and cooling water or air. It may be further cooled to 5 C by heat exchange against a refrigerated media. The condensed moisture is then removed from the cooled flue gas. The cooled flue gas is sent to a drier bed. The dry flue gas is sent to a $CO_2$ adsorber that removes $CO_2$ and lets $N_2$ and Ar pass through. The adsorber bed is provided with a heat transfer coil. The heat of adsorption is removed by circulating cold glycol in the bed. When one $CO_2$ adsorber bed is consumed, the next bed is brought online for adsorption. The consumed bed is heated for regeneration and thermo-compression of $CO_2$.

The regeneration of the bed is done at an elevated pressure of about 20-25 barg. The consumed bed is pressurized by product $CO_2$ stored at about 10-15 bar. The $CO_2$ is preheated to 300 C before sent for pressurization. Hot glycol at about 300-370 C is circulated in the coils in the bed. As the temperature of the bed rises, the pressure in the bed also increases corresponding to equilibrium pressure of $CO_2$ on zeolite. The back pressure control valve on the bed opens at 20 bar and hot $CO_2$ at about 300 C is cooled by glycol and sent to 20 bar Surge Drum. $CO_2$ is further compressed by a centrifugal compressor from 20 bar to the use pressure of about 150-200 bar.

When the bed being regenerated comes in equilibrium at about 300 C, no more $CO_2$ is released at 20 bar. Its pressure is slowly dropped to about 15 bar to release more $CO_2$, maintaining the bed temperature at 300 C. The $CO_2$ released between 20 and 15 bar is stored in a surge drum at 15 bar. It is cooled against a glycol solution before sent to surge drum. One part of the $CO_2$ stored at 15 bar is used for repressurization of the bed to be regenerated, remaining being compressed in the centrifugal compressor for end use.

This step is repeated at several pressure levels, for example at 10, 5 and 1 bar, while maintaining the bed temperature at 300 C, to fully regenerate the bed. The regenerated bed is cooled by flowing cold $N_2$ stream from the top of bed on $CO_2$ adsorption. Cold glycol is also circulated in the bed to recover the heat from the bed.

The number of pressure-stages for regeneration are optimized with respect to compression power, and the compressor selection is then matched accordingly. Obviously, the greater the number of stages, the lower will be the compression power. However, there is a practical limit. A typical $CO_2$ compressor may require between 8-9 stages for compression from about 1 bar to 200 bar. With interstage levels at probably 2, 4, 7, 10, 20, 35, 50, 90, 140, 200 bar.

During the repressurization with pure $CO_2$, the bed loads up with more $CO_2$. For example, the loading of $CO_2$ at the end of the $CO_2$ adsorption is 18%. When this bed is repressurized to 15 bar using pure $CO_2$ from a surge drum, its loading increases to about 25%. This increased $CO_2$ will be available at 20 bar when the bed temperature is increased.

Various process steps are described as follow:
Compression of flue gas to 0.3 barg
Cooling and chilling the flue gas to 5 C.
Drying flue gas over a adsorbent bed.
$CO_2$ adsorption at 5 C and 0.2 barg (0.1 bar pressure drop in the cooling/chilling). Cooling the bed with glycol to achieve isothermal conditions.
Pressurization of consumed bed with hot $CO_2$ to about 15 bar in 3 or 4 stages, using $CO_2$ stored in surge drums.
Simultaneously heating the bed with hot glycol to 300 C. Release $CO_2$ from the bed at 20 bar. 20 bar $CO_2$ is cooled with glycol and sent for further compression, if desired.
Lowering the bed pressure in several stages (15, 10, 7, 2, 1 bar), keeping the bed temperature at 300 C. Recovered $CO_2$ is cooled with glycol and sent to their respective surge drums.
Purging the bed with $N_2$ stream from the bed on $CO_2$ adsorption. Simultaneously cooling it with glycol.
Regeneration of drying bed with $N_2$ from $CO_2$ adsorption bed. $N_2$ is heated by heat exchange with hot glycol.
A glycol system that recovers heat from flue gas, process syngas, compressor interstages, and supplies heat to various users. Additional heat required can be supplied by steam or any hot stream in the SMR.

In one embodiment of the proposed apparatus, the adsorption reactors are designed to provide low pressure drop, quick heating and cooling. The adsorption reactors also provide for cooling during the adsorption step.

Glycol can flow from one bed to another, or glycol can be stored in surge drums at various temperature levels. The flow of glycol into or out of these surge drums is matched by heating and cooling requirements of the beds.

For partial CO2 recovery, CO2 released at lower pressures can be vented.

Radial beds with imbedded coils can provide these features.

Internal insulation of the beds is important for quick heating and cooling cycle. The vessel can be insulated with refractory and a metal liner, or it can be insulated by having thin gap (one or more) filled with gas like Argon.

A multi-stream heat exchanger for heat integration between various $CO_2$ and glycol streams is proposed for this application. These exchangers provide close temperature approach and also provide flexibility in heat transfer.

What is claimed is:

1. A process for the recovery of $CO_2$ from a flue gas, comprising,
   a) compressing a flue gas to a first pressure,
   b) cooling the flue gas to a first temperature,
   c) adsorbing $CO_2$ in a first adsorbent bed, wherein said first adsorbent bed is at said first temperature and said first pressure, wherein said first adsorbent bed is isothermally maintained by a first cooling means,
   d) pressurizing said first adsorbent bed to a second pressure with $CO_2$ at a second temperature, wherein said second pressure is greater than said first pressure, wherein said second temperature is greater than said first temperature,
   e) heating said first adsorbent bed to a third temperature with a first heating means, thereby increasing said first adsorbent bed to a third pressure, wherein said third temperature is greater than said second temperature, wherein said third pressure is greater than said second pressure, thereby releasing a first portion of adsorbed $CO_2$,
   f) lowering the pressure of said first adsorbent bed in at least one more stage, while said first adsorbent bed is isothermally maintained at said third temperature by a second heating means, thereby releasing at least a second portion of adsorbed $CO_2$,
   g) cooling the released $CO_2$ with at least a second cooling means,
   h) sending said cooled $CO_2$ to one or more surge drums,
   i) purging said first adsorption bed with a N2 stream, simultaneously cooling said first adsorption bed with a third cooling means,
   j) compressing said cooled $CO_2$ from said surge drums in a multi-stage compressor, wherein the pressure of the $CO_2$ from each surge drum is approximately equal to the inter-stage pressure into which it is admitted, and
   k) regenerating said first adsorption bed with a N2 stream, wherein said regeneration stream is heated by a third heating means.

2. The process of claim 1, further comprising b') drying flue gas by a drying means.

3. The process of claim 1, wherein said first pressure is between about 0.1 and about 2.0 barg.

4. The process of claim 3, wherein said first pressure is between about 0.3 and about 0.7 barg.

5. The process of claim 1, wherein said first temperature is between about 5 and about 25 C.

6. The process of claim 1, wherein said first temperature is between about 5 and about 10 C.

7. The process of claim 2, wherein said drying means is selected from the group consisting of silica gel, alumina, molecular sieve, and any combination thereof.

8. The process of claim 2, wherein said drying means is contact with a glycol solution.

9. The process of claim 1, wherein said first cooling means comprises cooling said first adsorption bed with glycol circulating in coils.

10. The process of claim 1, wherein said second pressure is between about 10 and about 10 bar.

11. The process of claim 1, wherein said first adsorption bed pressurization comprises either 3 or 4 stages of pressurization.

12. The process of claim 1, wherein said pressurization is obtained from $CO_2$ stored in said surge drums.

13. The process of claim 1, wherein at least one of said first heating means, said second heating means, or said third heating means comprises hot glycol.

14. The process of claim 1, wherein said third temperature is between about 250 and about 350 c.

15. The process of claim 1, wherein said third pressure is between about 20 and about 25 barg.

16. The process of claim 1, wherein said second cooling means comprises glycol.

17. The process of claim 1, wherein said third cooling means comprises glycol.

18. The process of claim 1, wherein adsorption step c) is performed in multiple vessels in parallel.

19. The process of claim 18, wherein there are one or more vessels simultaneously performing regeneration steps d-k.

20. The process of claim 1, wherein the heat required for at least one of said first heating means, said second heating means, and said third heating means is obtained by indirect heat exchange with a source selected from the group consisting of flue gas, process syngas of SMR, compressor inter-stage coolers and steam.

* * * * *